(12) United States Patent  
Palmantier et al.

(10) Patent No.: US 12,138,888 B2
(45) Date of Patent: Nov. 12, 2024

(54) COMPOSITE PANE WITH FUNCTIONAL FILM AND BUSBAR

(71) Applicant: SAINT-GOBAIN GLASS FRANCE, Courbevoie (FR)

(72) Inventors: Arthur Palmantier, Aachen (DE); Uwe Van Der Meulen, Nideggen (DE); Nino Tings, Eschweiler (DE); Simon Breuer, Baesweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/557,659

(22) PCT Filed: Apr. 21, 2022

(86) PCT No.: PCT/EP2022/060530
§ 371 (c)(1),
(2) Date: Oct. 27, 2023

(87) PCT Pub. No.: WO2022/228985
PCT Pub. Date: Nov. 3, 2022

(65) Prior Publication Data
US 2024/0217215 A1 Jul. 4, 2024

(30) Foreign Application Priority Data
Apr. 29, 2021 (EP) ..................... 21171134

(51) Int. Cl.
*B32B 3/02* (2006.01)
*B32B 7/02* (2019.01)
*B32B 17/10* (2006.01)
*G02B 27/01* (2006.01)

(52) U.S. Cl.
CPC .......... *B32B 17/10504* (2013.01); *B32B 7/02* (2013.01); *B32B 17/10036* (2013.01);
(Continued)

(58) Field of Classification Search
CPC .... B32B 3/02; B32B 3/10; B32B 3/18; B32B 7/02; B32B 17/10036; B32B 17/10174;
(Continued)

(56) References Cited

U.S. PATENT DOCUMENTS

| 5,882,774 | A | 3/1999 | Jonza et al. |
| 2004/0135742 | A1 | 7/2004 | Weber et al. |

(Continued)

FOREIGN PATENT DOCUMENTS

| DE | 698 20 012 T2 | 8/2004 |
| DE | 10 2008 026339 A1 | 12/2009 |

(Continued)

OTHER PUBLICATIONS

International Search Report as issued in International Patent Application No. PCT/EP2022/060530, dated Jun. 29, 2022.

(Continued)

*Primary Examiner* — Elizabeth E Mulvaney
(74) *Attorney, Agent, or Firm* — Pillsbury Winthrop Shaw Pittman LLP

(57) ABSTRACT

A composite pane with functional film includes a peripheral edge of the composite pane, a peripheral edge of the functional film, a busbar, an outer pane with exterior-side and interior-side surfaces, an inner pane with exterior-side and interior-side surfaces, and a thermoplastic intermediate layer that joins the interior-side surface of the outer pane to the exterior-side surface of the inner pane. The functional film is encased in the thermoplastic intermediate layer, the peripheral edge of the functional film is set back in the direction of the surface center of the composite pane relative to the peripheral edge of the composite pane, and the busbar is arranged between the interior-side surface of the outer pane and the exterior-side surface of the inner pane and runs between the peripheral edge of the composite pane and the (Continued)

Figure 1:
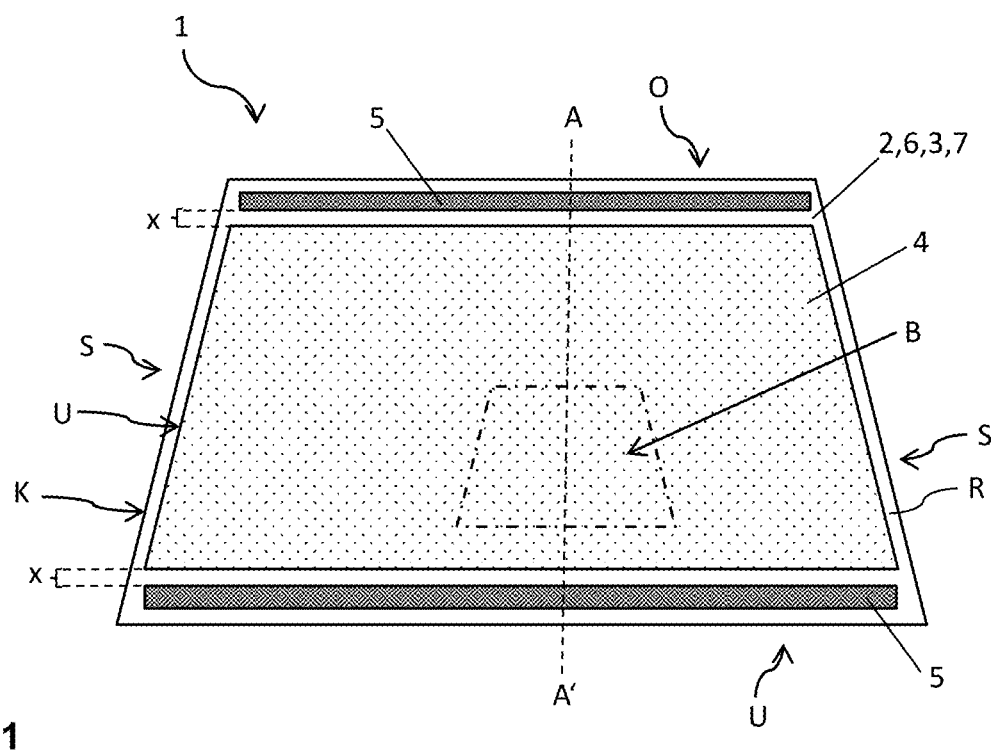

peripheral edge of the functional film in the edge region of the composite pane.

20 Claims, 2 Drawing Sheets

(52) U.S. Cl.
CPC ...... *B32B 17/1011* (2013.01); *B32B 17/1022* (2013.01); *B32B 17/10293* (2013.01); *B32B 17/10513* (2013.01); *B32B 17/10532* (2013.01); *B32B 17/10651* (2013.01); *B32B 17/10761* (2013.01); *B32B 17/10779* (2013.01); *B32B 17/10935* (2013.01); *G02B 27/0101* (2013.01); *B32B 2307/102* (2013.01); *B32B 2307/416* (2013.01); *B32B 2307/7376* (2023.05); *B32B 2457/20* (2013.01); *B32B 2605/08* (2013.01); *G02B 2027/012* (2013.01); *G02B 2027/0194* (2013.01)

(58) Field of Classification Search
CPC ........ B32B 17/10504; B32B 17/10293; B32B 17/10761
See application file for complete search history.

(56) References Cited

U.S. PATENT DOCUMENTS

| | | |
|---|---|---|
| 2004/0227462 A1 | 11/2004 | Utsumi et al. |
| 2007/0020465 A1 | 1/2007 | Thiel et al. |
| 2007/0082219 A1 | 4/2007 | Fleury et al. |
| 2012/0026573 A1 | 2/2012 | Collins et al. |

FOREIGN PATENT DOCUMENTS

| | | |
|---|---|---|
| DE | 20 2008 017611 U1 | 4/2010 |
| DE | 10 2014 220189 A1 | 4/2016 |
| EP | 0 876 608 B1 | 4/2002 |
| EP | 0 847 965 B1 | 10/2004 |
| EP | 1 862 849 A1 | 12/2007 |
| WO | WO 03/024155 A2 | 3/2003 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2012/052315 A1 | 4/2012 |
| WO | WO 2012/104547 A1 | 8/2012 |
| WO | WO 2013/104438 A1 | 7/2013 |
| WO | WO 2013/104439 A1 | 7/2013 |
| WO | WO 2016/175183 A1 | 11/2016 |
| WO | WO 2017/204103 A1 | 11/2017 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: https://mediaturn.ub.tum.de/10796892?id=1079689&change_language=en>. (English abstract on p. 5 of document).

COMPOSITE PANE WITH FUNCTIONAL FILM AND BUSBAR

CROSS-REFERENCE TO RELATED APPLICATIONS

This application is the U.S. National Stage of PCT/EP2022/060530, filed Apr. 21, 2022, which in turn claims priority to European patent application number 21171134.6 filed Apr. 29, 2021. The content of these applications are incorporated herein by reference in their entireties.

The invention relates to a composite pane comprising a functional film and at least one busbar and a method for producing such a composite pane.

Modern automotive glazings are increasingly equipped with additional functions such as heatable layers, functional elements with electrically switchable optical properties, and displays. Often, several of these elements are integrated within one glazing.

In particular, windshields are often equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the driver's field of vision, for example, the current driving speed, navigation or warning messages, which the driver can perceive without having to take his eyes off the road. Head-up displays can thus contribute significantly to an increase in traffic safety.

DE 10 2014 220 189 A1 discloses an HUD projection assembly operated with p-polarized radiation to generate an HUD image. Since the angle of incidence is typically close to Brewster's angle and p-polarized light is therefore reflected only to a small extent by the glass surfaces, the windshield has a reflecting structure that can reflect p-polarized light in the direction of the driver. A single metallic layer with a thickness from 5 nm to 9 nm, for example, made of silver or aluminum, which is applied on the outer side of the inner pane facing away from the interior of the passenger car, is proposed as the reflecting structure.

US 2004/0135742 A1 likewise discloses an HUD projection assembly that operates with p-polarized radiation to generate an HUD image and has a reflecting structure that can reflect the p-polarized radiation in the driver's direction. The multi-ply polymer layers disclosed in U.S. Pat. No. 5,882,774 A are proposed as the reflecting structure.

DE 698 20 012 T2 discloses a method for laminating composite panes comprising a polymeric intermediate layer with an infrared-reflecting coating, wherein layer portions of the polymeric intermediate layer bearing the infrared-reflecting coating are removed in the edge region of the composite pane. Thus, corrosion of the coating starting from the pane edges is avoided.

Both head-up displays and other display applications or functional elements with electrically switchable optical properties are often used in the form of functional films. This has the advantage that the functional film is easy to introduce into the layer stack during lamination of a composite pane and can be prefabricated independently of the production of the composite pane. These functional films are generally based on one or more polymeric carrier films on or between which functional layers are applied. During lamination, these polymeric carrier films are bonded to the panes of the composite pane via thermoplastic bonding films. In this process, it is important to ensure that complete deaeration of the layer stack occurs and also that air inclusions situated between carrier films and bonding films are completely removed. Remaining air inclusions result in product defects. If, in addition to the functional film to be integrated, further elements are mounted that require a busbar for electrical contacting, complete deaeration becomes even more difficult. In addition to the problems described, increased attention must be paid to air pockets in the vicinity of the busbar.

Accordingly, there is a need for composite panes comprising functional films and busbars that do not have these disadvantages of the prior art. The object of the present invention is to provide such an improved composite pane and a method for its production.

The object of the present invention is accomplished according to the invention in accordance with claim 1. Preferred embodiments emerge from the dependent claims.

The composite pane according to the invention comprises an outer pane and an inner pane. The outer pane has an exterior-side surface I and an interior-side surface II, while the inner pane has an exterior-side surface III and an interior-side surface IV. The interior-side surface II of the outer pane is joined to the exterior-side surface III of the inner pane via a thermoplastic intermediate layer. A functional film is encased in the thermoplastic intermediate layer of the composite pane. The composite pane has a peripheral edge. The functional film likewise has a peripheral edge, with the peripheral edge of the functional film set-back from the peripheral edge of the composite pane in the direction of the surface center of the composite pane. The functional film is encased in the thermoplastic intermediate layer. Furthermore, the composite pane according to the invention includes at least one busbar. The busbar is integrated in the composite pane between the interior-side surface II of the outer pane and the exterior-side surface III of the inner pane. The busbar runs in the edge region of the composite pane between the peripheral edge of the composite pane and the peripheral edge of the functional film. According to the invention, the distance of the at least one busbar from the peripheral edge of the functional film is between 5 mm and 50 mm, measured along the busbar. In each case, the shortest distance between the busbar and the peripheral edge of the functional film is considered in each case.

The composite pane according to the invention enables the combination of a functional film with a busbar that is arranged in the edge region of the composite pane next to the functional film without the occurrence of air inclusions and defects of the composite pane associated therewith. The inventors found that for good lamination of the composite pane, the distance of 5 mm to 50 mm between the functional film and the busbar according to the invention is essential. If the distance is too small, the air situated between the peripheral edge of the functional film and the busbar does not have sufficient opportunity to escape. If the distance is too large, the gap between the peripheral edge of the functional film and the busbar cannot be filled uniformly by the material of the thermoplastic bonding film melting during the lamination process, and defects also occur. In contrast, in the range according to the invention, defect-free deaeration can be achieved.

Preferably, the distance of the at least one busbar from the peripheral edge of the functional film is 10 mm to 30 mm, particularly preferably 15 mm to 25 mm, measured along the busbar as the shortest distance in each case. Within these ranges, particularly uniform lamination can be observed.

The composite pane is intended, in a window opening, in particular the window opening of a vehicle, to separate the interior from the external surroundings. In the context of the invention, "inner pane" refers to the pane of the composite pane facing the interior (in particular the vehicle interior).

"Outer pane" refers to the pane facing the external surroundings. The composite pane is preferably a vehicle windshield (in particular the windshield of a motor vehicle, for example, a passenger car or a truck). However, the composite pane can also be a side window or a roof panel of a vehicle.

The composite pane has an upper edge and a lower edge and two side edges extending therebetween. "Upper edge" refers to the edge intended to point upward in the installed position. "Lower edge" refers to the edge intended to point downward in the installed position. The upper edge is also often referred to as the "roof edge"; the lower edge, as the "engine edge".

The outer pane and the inner pane have in each case an exterior-side and an interior-side surface and a peripheral side edge extending therebetween. In the context of the invention, "exterior-side surface" refers to the primary surface intended to face the external surroundings in the installed position. In the context of the invention, "interior-side surface" refers to the primary surface intended to face the interior in the installed position. The interior-side surface of the outer pane and the exterior-side surface of the inner pane face one another and are joined to one another by the thermoplastic intermediate layer.

A wide variety of single layer or multilayer films known to the person skilled in the art can be used as functional films. The invention is in particular suitable for integrating functional films having a carrier film material that itself exhibits poor adhesion to glass. Due to the low adhesion to glass, such carrier films are encased between thermoplastic bonding films, making bubble-free deaeration of such layer stacks difficult, even in the absence of a busbar in the edge region of the composite pane. Preferably, the functional film comprises at least one carrier film based on polyethylene terephthalate (PET), polyethylene (PE), polymethyl methacrylate (PMMA), triacetyl cellulose (TAC), and/or polycarbonate and/or copolymers or mixtures thereof, particularly preferably a carrier film based on polyethylene terephthalate (PET). These materials are used as carrier film material of commercially available functional films and exhibit the deaeration problems described. The presence of a busbar in the edge region further complicates deaeration. The invention remedies this.

Known functional films used in the automotive sector are, for example, HUD films, display films, as well as functional films with electrically switchable optical properties. Functional films with electrically switchable optical properties include, for example, PDLC films, SPD films, elektrochrome films, or electroluminescent films. These functional films with electrically switchable optical properties are generally designed as multilayer films comprising one or more carrier films and an active layer arranged thereon or therebetween. PET is generally used as the carrier film material. The active layer changes its optical properties when an electrical voltage is applied.

In one possible embodiment, the functional film is a PDLC film (polymer dispersed liquid crystal). The active layer of a PDLC functional film contains liquid crystals embedded in a polymer matrix. The active layer is arranged between two carrier films, with flat electrodes situated on the surfaces of the carrier films facing the active layer. When no voltage is applied to the flat electrodes, the liquid crystals are aligned in a disorderly manner, resulting in strong scattering of the light passing through the active layer. When a voltage is applied to the flat electrodes, the liquid crystals align themselves in a common direction, and the transmittance of light through the active layer is increased. Such a PDLC functional film is known, for example, from DE 102008026339 A1.

In further possible embodiments, the functional film is an SPD, an electrochromic, or an electroluminescent functional film.

An SPD film (suspended particle device) contains an active layer comprising suspended particles, wherein the absorption of light by the active layer can be varied by applying a voltage to the flat electrodes. The change in absorption is based on the orientation of the rodlike particles in the electrical field when an electrical voltage is applied. SPD-functional films are known, for example, from EP 0876608 B1 and WO 2011033313 A1.

In an electrochromic functional film, the active layer of the functional element is an electrochemically active layer. The transmittance of visible light depends on the rate of ion storage in the active layer, with the ions provided, for example, by an ion storage layer between an active layer and a flat electrode. The transmittance can be influenced by the voltage applied to the flat electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional films, the active layer contains electroluminescent materials, in particular organic electroluminescent materials whose luminescence is excited by applying a voltage. Electroluminescent functional films are known, for example, from US 2004227462 A1 and WO 2010112789 A2. The electroluminescent functional film can be used as a simple light source or as a display with which any displays can be shown.

Further functional films preferred within the scope of the invention are display films including a diffusely reflecting layer or surface, which reflects incident light diffusely. The term "diffuse reflection" is understood conceptually to mean non-directional reflection. For example, an image of a projector directed from the interior of a vehicle onto the inner pane of the vehicle glazing is displayed on the diffusely reflecting layer, with the display film showing a real image in the plane of the composite pane. A real image differs from a virtual image, with the virtual image being in a different plane than the projection plane and the real image is depicted in the projection plane.

The display film includes, for example, a diffusely reflecting internal surface having a diffusely reflecting coating. The diffusely reflecting coating preferably includes nanoparticles or microparticles such as silicon dioxide particles, polymeric particles, or liquid crystals. Alternatively, metal or metal oxide particles can also be used. In particular, the nanoparticles or microparticles mentioned have a spherical shape and/or are transparent or translucent. In particular, display films with a diffusely reflecting coating comprising titanium oxide particles ($TiO_x$ particles) or silver particles have, in particular, proved to be advantageous. In the same way, display films with organic diffusely reflecting coatings containing cholesteric liquid crystals are very well suited for ensuring good image quality. In a particularly preferred embodiment, the display film includes cholesteric liquid crystals oriented in a matrix. A possible example of a display film is described in WO 2017/204103 A1, wherein the film includes randomly dispersed cholesteric liquid crystal droplets covered by a layer matched in refractive index. The cholesteric liquid crystal droplets have essentially the shape of a hemisphere, the radius of which depends on the contact angle between the film and the droplet. Wavelength selectivity of the display film is also possible, as described, for example, in WO 2016/175183 A1.

When one surface of the display film comprises a random nanostructure or microstructure, another surface of the display film is preferably smooth.

In another preferred embodiment, the display film comprises a patterned plastic film, wherein the patterned plastic film has multiple patterned surfaces and the properties of the display film are determined by the incline of the contact surfaces between adjacent patterned layers. Exemplary embodiments and methods for patterning the layers of the display film are described in WO 2012/104547 A1. Compared to the particle-based display films, with the patterned display films, it is often possible to achieve less haze and a better luminance factor (also referred to as "screen gain").

Preferably, the display film includes, as a carrier material, a film containing polyethylene (PE), polyethylene terephthalate (PET), polymethyl methacrylate (PMMA), triacetyl cellulose (TAC), and/or polycarbonate.

Suitable display films are, in principle, commercially available, with triacetyl cellulose, polymethyl methacrylate, or polycarbonate used as common carrier materials. These materials exhibit only very low adhesion to glass panes and are, for this reason, encased between thermoplastic bonding films, making bubble-free deaeration of such layer stacks difficult, even in the absence of a busbar in the edge region of the composite pane.

Particularly preferably, the functional film is a reflecting film usable as an HUD film. The reflecting film is metal-free and is suitable for reflecting at least 5%, preferably 10% to 50%, particularly preferably 15% to 30%, in particular 20% to 25%, of p-polarized light incident on the film. This is particularly advantageous in terms of a good HUD image.

The reflecting film preferably has a thickness between 20 μm (microns) and 120 μm, particularly preferably between 30 μm and 90 μm, most particularly preferably between 50 μm and 75 μm.

The reflecting film is preferably a polyethylene terephthalate (PET) based film that is coated with a copolymer layer stack based on PET and/or polyethylene naphthalate (PEN). The coating is preferably applied on the interior-side surface, i.e., the surface that faces the vehicle interior. Suitable reflecting films are described, for example, in U.S. Pat. No. 5,882,774 A.

In particular, with the reflecting films described as HUD films or the diffusely reflecting display films, there is a great need to integrate these functions in a composite pane simultaneously with elements that require a voltage supply. These include, for example, heatable composite panes that simultaneously have an HUD film or a diffusely reflecting display film.

The at least one busbar of the composite pane according to the invention makes it possible to supply voltage to an electrical element in the composite pane, with the distance of the busbar from the functional film actually making it possible to combine the electrical element with the functional film.

Preferably, the composite pane includes at least two busbars. The busbars are preferably mounted on two opposite sections of the peripheral edge of the composite pane. In this way, voltage can be applied to opposite sections of an electrical element.

Preferably, the at least one busbar is mounted on an electrically conductive layer and is in electrically conductive contact therewith. Particularly preferably, at least two busbars are electrically conductively contacted on the electrically conductive layer, with both busbars arranged in the edge region of the composite pane at a distance of 5 mm to 50 mm from the peripheral edge of the functional film. In each case, the shortest distance between the busbar and the closest edge of the functional film is taken into account.

The electrically conductive layer can be introduced into the composite pane by various technologies known to the person skilled in the art. Preferably, the electrically conductive layer is mounted on a carrier film or directly on one pane of the composite pane.

The electrically conductive layer is preferably mounted flat on the interior-side surface of the outer pane or the exterior-side surface of the inner pane. Preferably, the electrically conductive layer is a heating layer. The electrically conductive layer has at least two busbars, which are preferably arranged on opposite sections of the peripheral edge of the composite pane. When an electrical voltage is applied between the at least two busbars, an electric current flows through the electrically conductive layer, heating it.

If the functional film according to the invention is a reflecting film as an HUD film or a diffusely reflecting display film, the electrically conductive layer is preferably arranged on the interior-side surface of the outer pane. This has the advantage that the electrically conductive layer does not affect the image projected onto the functional film.

Glazings with electrically conductive layers are known to the person skilled in the art. In principle, any electrically conductive layers that can be electrically conductively contacted can be used in connection with the invention.

The electrically conductive layer contains at least a metal, a metal alloy, or a transparent conductive oxide, preferably a transparent conductive oxide, and has a thickness of 10 nm to 2 μm. The electrically conductive layer is preferably transparent. Here, "transparent" means permeable to electromagnetic radiation, preferably electromagnetic radiation of a wavelength from 300 nm to 1.300 nm and, in particular, to visible light. Suitable electrically conductive layers are known, for example, from WO03/024155, US2007/0082219A1, US2007/0020465A1, WO2013/104438 or WO2013/104439, DE 20 2008 017 611 U1, EP 0 847 965 B1, or WO2012/052315 A1. They typically contain one or more, for example, two, three, or four, electrically conductive, functional individual layers. The functional individual layers preferably contain at least one metal, for example, silver, gold, copper, nickel, and/or chromium, or a metal alloy. The functional individual layers particularly preferably contain at least 90 wt.-% of the metal, in particular at least 99.9 wt.-% of the metal. The functional individual layers can be made of the metal or the metal alloy. The functional individual layers particularly preferably contain silver or a silver-containing alloy. Such functional individual layers have particularly advantageous electrical conductivity with, at the same time, high transmittance in the visible spectral range. The thickness of a functional individual layer is preferably from 5 nm to 50 nm, particularly preferably from 8 nm to 25 nm. In this thickness range, advantageously high transmittance in the visible spectral range and particularly advantageous electrical conductivity are achieved.

The busbars include an electrically conductive structure, preferably containing silver, and have, for example, a thickness of 5 μm to 40 μm. The width of the busbars is preferably 0.5 mm to 30 mm, particularly preferably 1 mm to 20 mm. The busbars are preferably mounted at a distance of 0.5 mm to 20 cm from the nearest section of the peripheral edge of the composite pane.

The busbars are intended to be connected to an external voltage source, with a current flow occurring via the electrically conductive layer as a result of a difference in electrical potential.

The busbars can be mounted in particular by placement, printing, soldering, or gluing.

In a preferred embodiment, the busbars are implemented as a printed and baked conductive structure. The printed busbars contain at least one metal, preferably silver. The electrical conductivity is preferably realized via metal particles contained in the busbar, particularly preferably via silver particles. The metal particles can be situated in an organic and/or inorganic matrix such as pastes or inks, preferably as baked screen printing paste with glass frits. The layer thickness of the printed busbars is preferably from 5 µm to 40 µm, particularly preferably from 8 µm to 20 µm, and most particularly preferably from 10 µm to 15 µm. Printed busbars with these thicknesses are technically simple to realize and have advantageous current carrying capacity.

In another preferred embodiment, the busbars are implemented as strips of an electrically conductive film. In that case, the busbars contain, for example, at least aluminum, copper, tinned copper, gold, silver, zinc, tungsten, and/or tin or alloys thereof. The strip preferably has a thickness of 10 µm to 500 µm, particularly preferably of 30 µm to 300 µm. Busbars made of electrically conductive films with these thicknesses are technically simple to realize and have advantageous current carrying capacity. The strip can be electrically conductively connected to the electrically conductive layer, for example, via a soldering compound, an electrically conductive adhesive, or an electrically conductive adhesive tape, or by direct placement. To improve the conductive connection, a silver-containing paste, for example, can be arranged between the electrically conductive layer and the busbar.

The thermoplastic intermediate layer preferably comprises at least one first thermoplastic bonding film and one second thermoplastic bonding film, between which the functional film is inserted. The first thermoplastic bonding film and the second thermoplastic bonding film are arranged above and below the functional film and surround the functional film. The first thermoplastic bonding film bonds the functional film to the outer pane, and the second bonding film bonds the functional film to the inner pane.

The first thermoplastic bonding film and the second thermoplastic bonding film can, independently of one another, contain at least polyvinyl butyral (PVB), ethylene vinyl acetate (EVA), polyurethane (PU), or mixtures or copolymers or derivatives thereof, preferably polyvinyl butyral (PVB).

The first thermoplastic bonding film and the second thermoplastic bonding film can, independently of one another, be implemented by a single film or also by more than one film.

The first thermoplastic bonding film and the second thermoplastic bonding film can be between 20 µm (microns) and 2 mm thick. The first thermoplastic bonding film and/or the second thermoplastic bonding film can be, for example, between 0.2 mm and 2 mm thick, particularly preferably from 0.3 mm to 1 mm, for example, 0.38 mm or 0.76 mm. The thickness of the first thermoplastic bonding film and the thickness of the second thermoplastic bonding film are preferably constant over the entire length, thus, the intermediate layers have a rectangular cross-section. Accordingly, the bonding films are not wedge films. If the first thermoplastic bonding film or the second thermoplastic bonding film is a functional bonding film with acoustically damping properties, it is preferably 0.51 mm or 0.84 mm thick.

In a particularly preferred embodiment, the functional film is a reflecting film as an HUD film or a diffusely reflecting display film, wherein the first thermoplastic bonding film has a thickness of 200 µm to 1000 µm, preferably 300 µm to 850 µm, and the second thermoplastic bonding film is between 10 µm and 120 µm thick, preferably between 15 µm and 90 µm, particularly preferably between 20 µm and 75 µm. When the composite pane is used as a head-up display or diffuse display of a motor vehicle, a projector is generally mounted in the region of the dashboard and an image is projected onto the interior-side surface of the inner pane. In this case, the second thermoplastic bonding film is positioned in the beam path between the projector and the functional film. If the second thermoplastic bonding film is made as thin as possible, this is advantageous in terms of the image quality of the projected image.

Optionally, the first thermoplastic bonding film or the second thermoplastic bonding film or both the first thermoplastic bonding film and the second thermoplastic bonding film is in each case a functional intermediate layer. Here, "functional intermediate layer" refers to a bonding film that has at least one specific function, in particular, an acoustic function, a color function, a solar function, or a combination of these functions.

In one embodiment, only the first thermoplastic bonding film or only the second thermoplastic bonding film is a functional intermediate layer. However, it is also possible for both the first thermoplastic bonding film and the second thermoplastic bonding film to be functional intermediate layers, with them having the same or preferably different functions.

In a particularly preferred embodiment, the first thermoplastic bonding film and/or the second thermoplastic bonding film is a functional intermediate layer with acoustically damping properties. Such an acoustically damping bonding film typically consists of at least three plies, with the middle ply having higher plasticity or elasticity than the outer layers surrounding it, for example, as a result of a higher proportion of plasticizers.

It has proved to be particularly advantageous for the first thermoplastic bonding film, which joins the functional film to the outer pane, to be implemented as an acoustically damping bonding film. Advantageous acoustic properties of the composite pane result from this.

Acoustically damping bonding films are usually characterized by a so-called "mechanical impedance measurement" (MIM). This is a standardized procedure described in ISO 16940, from which the damping can be calculated by measuring the natural frequencies. According to the standard, the acoustically damping bonding film layer to be investigated is laminated between two 2.1-mm-thick glass panes to enable appropriate comparability for different glass thicknesses. The person skilled in the art can thus select suitable intermediate layers on the basis of a well-known standardized measurement procedure.

The mechanical impedance measurement is carried out, at the earliest, one month after production of the composite glass. Furthermore, the acoustically damping bonding film itself is laminated with the two 2.1-mm-thick glass panes to form a composite glass, at the earliest, one month after its manufacture. This ensures that a stable state has developed at the time of the measurement.

In a preferred embodiment of the invention, an acoustically damping bonding film is used as the first bonding film, where the following applies: the damping factor $\eta_1$ of the first mode and the damping factor $\eta_2$ of the second mode of a composite glass pane with a surface area of 25 mm×300 mm consisting of two glass panes with a thickness of 2.1 mm in each case, between which the acoustically damping bonding film is laminated, is $\eta_1 \geq 0.20$ and $\eta_2 \geq 0.25$, preferably $\eta_1 \geq 0.25$ and $\eta_2 \geq 0.30$, particularly preferably $\eta_1 \geq 0.25$ and $\eta_2 \geq 0.35$, in a mechanical impedance measurement (MIM) per ISO 16940 at a temperature of 20° C.

Preferably, the functional film extends over at least 80% of the pane surface. In particular, the functional film is arranged over the entire surface between the first thermoplastic intermediate layer and the second thermoplastic intermediate layer with the exception of a peripheral edge region, which is intended, as a communication window, to ensure transmission of electromagnetic radiation through the composite pane such that, consequently, preferably, no functional film is arranged there. In regions in which busbars are provided, the distances between the functional film and the busbar are implemented according to the invention. In the remaining regions along the peripheral edge of the composite pane, the functional film is preferably removed in a peripheral edge region. The peripheral edge region in which no functional film is arranged has, for example, a width of up to 20 cm, in particular a width of 20 mm. It also prevents direct contact of the functional film with the surrounding atmosphere such that the functional film in the interior of the composite pane is protected against corrosion and damage.

In one embodiment, the functional film extends over the entire pane surface with the exception of regions of the busbars, in which the distances according to the invention apply.

The composite pane according to the invention can additionally include a masking print, in particular of a dark, preferably black, enamel. The masking print is, in particular, a peripheral, i.e., frame-like, masking print. The peripheral masking print serves primarily as UV protection for the mounting adhesive of the composite pane. The masking print can be opaque and cover the entire surface. The masking print can also be semi-transparent, at least in sections, for example, as a dot grid, strip grid, or checkered grid. Alternatively, the masking print can also have a gradient, for example, from an opaque covering to a semi-transparent covering. In a preferred embodiment, the masking print is implemented such that the side edges of the reflecting film are covered by it when the composite pane is viewed from above. If the composite pane has communication, sensor, or camera windows, the masking print is preferably enlarged around the communication, sensor, or camera windows in the direction of the center of the pane such that the cut edges of the recess(es) around the communication, sensor, or camera windows are also concealed by the masking print.

The masking print is usually applied on the interior-side surface of the outer pane or on the interior-side surface of the inner pane.

Preferably, the peripheral edge of the functional film is concealed by the opaque masking print of the composite pane. Since the busbars of the composite pane are positioned between the peripheral edge of the functional film and the peripheral edge of the composite pane, these are also concealed by the masking print. This results in a visually attractive masking of the busbars at the edge of the functional film.

The outer pane and/or the inner pane can have anti-reflection coatings, nonstick coatings, scratch-resistant coatings, photocatalytic coatings, sun-shading coatings, or low-E coatings.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, with the standard thicknesses of 1.6 mm or 2.1 mm. It is, however, also possible for the outer pane and/or the inner pane to have a thickness of 0.55 mm or 0.7 mm.

The outer pane and the inner pane can, independently of one another, be clear and colorless, but also tinted or colored. In a preferred embodiment, the total transmittance through the composite glass is greater than 70%. The term "total transmittance" is based on the process for testing the light permeability of motor vehicle windows specified by ECE-R 43, Annex 3, § 9.1.

The outer pane and the inner panes can, independently of one another, be non-prestressed, partially prestressed, or prestressed. If at least one of the panes is to be prestressed, this can be thermal or chemical prestressing.

The composite pane according to the invention is preferably curved in one or a plurality of spatial directions, as is customary for motor vehicle panes, wherein typical radii of curvature are in the range from approx. 10 cm to approx. 40 m. The composite pane according to the invention can, however, also be flat, for example, when it is intended as a pane for buses, trains, or tractors.

In one possible embodiment, the first thermoplastic bonding film and/or the second thermoplastic bonding film is a functional intermediate layer with a color function. This means the intermediate layer is colored or tinted. The intermediate layer can be tinted or colored over its entire surface. Alternatively, the intermediate layer can also have a color gradient or a colored pattern. In the case of composite panes that are provided as windshields, the coloring or tinting is implemented such that the composite pane has light transmittance greater than 70% in the spectral range from 380 nm to 780 nm. In the case of composite panes that are provided as roof panels or rear side windows, the coloring or tinting can also be darker and the composite panes can thus have light transmittance of 70% or less in the spectral range from 380 nm to 780 nm.

The first thermoplastic bonding film and/or the second thermoplastic bonding film can also be a functional intermediate layer in which two or more functional properties are combined, for example, acoustically damping properties with a color function and/or a solar function.

A particularly preferred embodiment of the composite pane according to the invention preferably comprises a functional film that is a reflecting film as an HUD film or a diffusely reflecting display film, preferably a reflecting film as an HUD film. The composite pane has at least two busbars that make electrically conductive contact with the electrically conductive layer and which are in each case mounted along the peripheral edge of the composite pane at the distances from the functional film according to the invention. The electrically conductive layer is applied to the interior-side surface of the outer pane and is preferably provided as a heating layer. The busbars are arranged along opposite sections of the peripheral edge of the composite pane.

Such a preferred embodiment of the composite pane according to the invention with a functional film as an HUD film can be equipped with a projector, thus obtaining a projection assembly for a head-up display (HUD). Such a projection assembly is primarily used in motor vehicles, wherein the composite pane is preferably a windshield. As is usual with HUDs, the projector irradiates a region of the windshield where the radiation is reflected in the direction of the viewer (driver), generating a virtual image that the viewer perceives, from his perspective, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by readjustment of the mirrors, with the entire region thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The proportion of p-polarized radiation in the total radiation of the projector is preferably at least 70%. In an advantageous embodiment of a projection assembly for a head-up display, the proportion of p-polarized radiation in the total radiation of the projector is at least 80%: particularly preferably, the proportion of p-polarized radiation in the total radiation of the projector is 80% or 100%, most particularly preferably 100%.

The indication of the polarization direction is based on the plane of incidence of the radiation on the composite pane. P-polarized radiation refers to radiation whose electric field oscillates in the plane of incidence. S-polarized radiation refers to radiation whose electric field oscillates perpendicular to the plane of incidence. The plane of incidence is generated by the vector of incidence and the surface normal of the composite pane in the geometric center of the HUD region.

The radiation of the projector preferably strikes the composite pane at an angle of incidence of 50° to 80°, in particular of 60° to 70°, typically approx. 65°, as is usual with HUD projection assemblies. The angle of incidence is the angle between the vector of incidence of the projector radiation and the surface normal in the geometric center of the HUD region. Since the angle of incidence of approx. 65° typical for HUD projection assemblies is relatively close to Brewster's angle for an air-glass transition (57.2°, soda lime glass), the p-polarized radiation components of the radiation emitted by the projector are hardly reflected by the pane surfaces. However, the reflecting film contained in the composite pane is optimized to reflect p-polarized radiation. In this way, the image perceived by the viewer is not distorted by a ghost image or is only distorted to a very small extent. A wedge-shaped intermediate layer can thus be dispensed with.

In one embodiment of the projection assembly, 10% to 50%, preferably 15% to 30%, particularly preferably 20% to 25% of the p-polarized light emitted by the projector and incident on the reflecting film of the composite pane is reflected in the direction of the viewer by the reflecting film.

The invention further relates to a method for producing a composite pane according to the invention at least comprising the steps a) Providing an inner pane or an outer pane,
    b) Mounting at least one busbar,
    c) Placing a thermoplastic intermediate layer with functional film, and
    d) Placing an outer pane or inner pane to complete the layer stack and laminating to form a composite pane,
    wherein, before or during step c), the functional film is cut back and, after being cut back, the peripheral edge of the functional film has a distance of 5 mm to 50 mm from at least one busbar.

Preferably, before or during step a), an electrically conductive layer is applied to the interior-side surface of the outer pane or the exterior-side surface of the inner pane and the at least one busbar is electrically conductively applied to the electrically conductive layer. The electrically conductive layer is applied by means of methods known to the person skilled in the art. Preferably, the electrically conductive layer is applied to a pane surface by physical vapor deposition (PVD), particularly preferably by cathodic sputtering ("sputtering"), most particularly preferably by magnetron-enhanced cathodic sputtering ("magnetron sputtering"). The electrically conductive layer is applied before the lamination of the composite pane. Instead of applying the coating to a pane surface, it can, in principle, be provided on a carrier film.

The thermoplastic intermediate layer with the functional film is placed, in step c) in one or more steps. Preferably, the thermoplastic intermediate layer comprises at least one first thermoplastic bonding film and one second thermoplastic bonding film, between which the functional film is inserted. The functional film can be inserted between the thermoplastic bonding films before placement of the intermediate layer in step c). In this case, the thermoplastic intermediate layer is placed with the functional film as a trilayer in one step. Optionally, the thermoplastic bonding films and the functional film can also be placed individually in step c), with the intermediate layer with the encased functional film resulting directly in step c).

The cutting back of the functional film before or during step c) can be carried out by methods customary in the art, such as laser cutting or trimming with a knife blade.

Preferably, during or after step b) and before step d), a deaeration structure is embossed into the at least one busbar. The deaeration structure further facilitates the deaeration of the layer stack. The deaeration structure can, for example, be introduced into the at least one busbar by means of a patterned roller, a toothed rolling tool, or similar tools.

In step d), the composite pane according to the invention can be laminated by methods known per se. The outer pane, the inner pane, and the interposed functional film are laminated to one another via the thermoplastic bonding films, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

If the composite pane is to be bent, the outer pane and the inner pane are subjected to a bending process preferably before lamination. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

The above-described embodiments of the method also apply mutatis mutandis to the composite pane according to the invention and vice versa.

The invention also includes the use of a composite pane implemented according to the invention in a motor vehicle, preferably a passenger car, as a windshield that serves as a projection surface of a projection assembly for a head-up display. A composite pane implemented according to the invention can also be used as a side window or as a roof panel in a motor vehicle, preferably a passenger car. In these cases as well, the composite pane can serve as a projection surface for a head-up display. The above-described preferred embodiments apply mutatis mutandis to the use.

In the following, the invention is explained in greater detail with reference to drawings and exemplary embodiments. The drawings are schematic representations and are not to scale. The drawings in no way restrict the invention.

Figure 2:
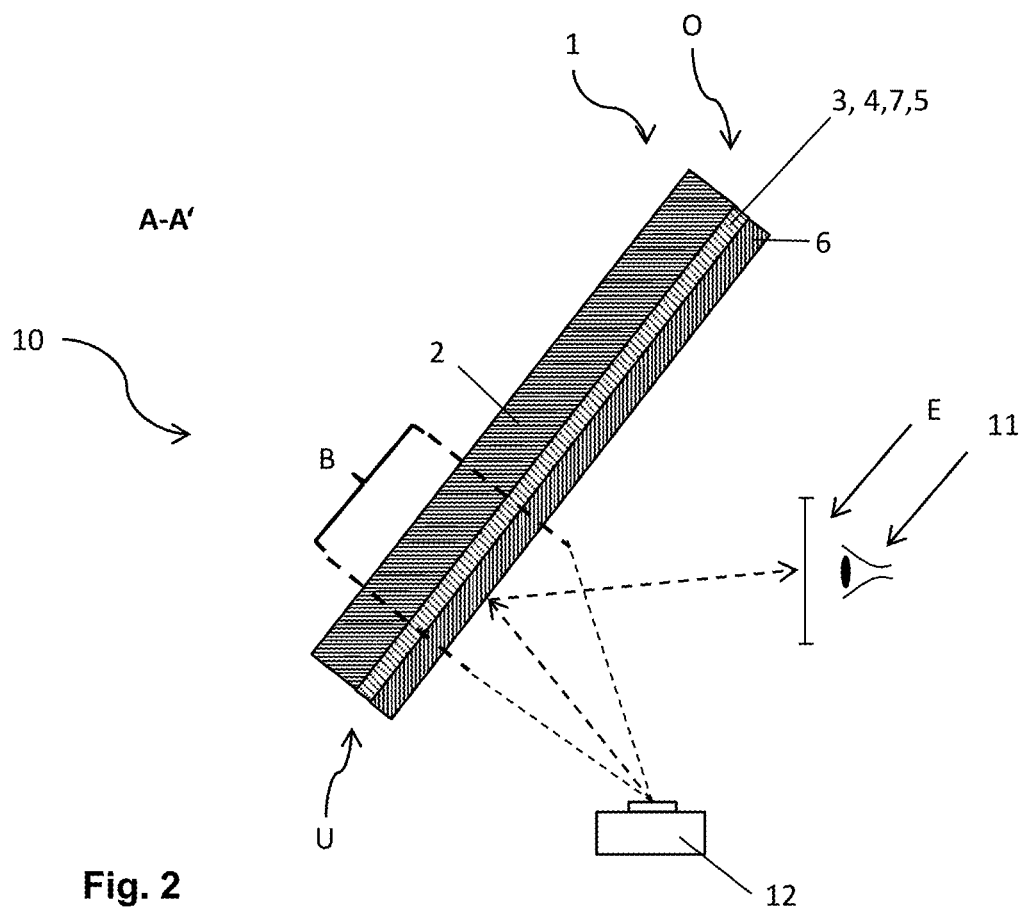
Figure 3:
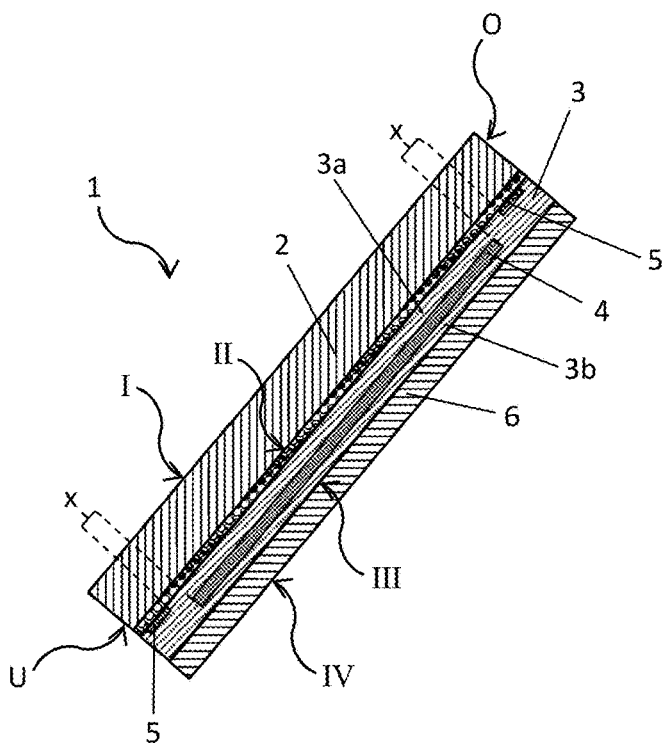
Figure 4:
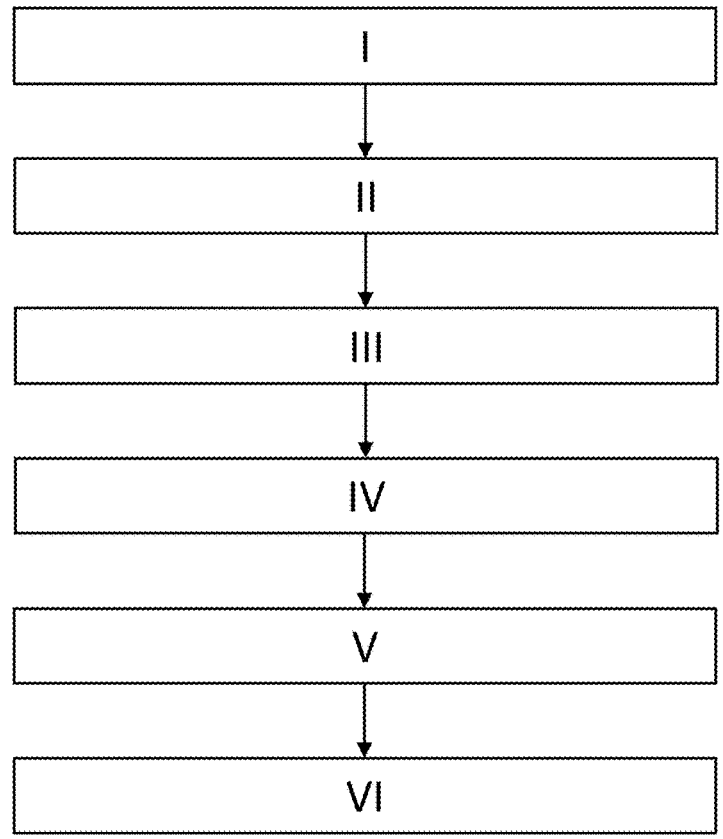

They depict:

FIG. 1 a plan view of a composite pane according to the invention as a head-up display with an HUD region, FIG. 2 a projection assembly comprising the composite pane of FIG. 1 in cross-section along the section line A-A' through the composite pane of FIG. 1, FIG. 3 the composite pane of FIG. 1 with detailed layer structure of the thermoplastic intermediate layer 3, FIG. 4 an embodiment of the method according to the invention.

FIG. 1 depicts a composite pane 1 according to the invention as a windshield, in particular as a windshield of a passenger car, in plan view. The composite pane 1 is made up of an outer pane 2 and an inner pane 6 joined to one another via a thermoplastic intermediate layer 3. A ffunctional film 4 is encased In the thermoplastic intermediate layer 3. The functional film 4 is a reflecting film as an HUD film. The composite pane has an HUD region B, in which images can be projected onto the windshield by means of a projector. The peripheral edge K of the composite pane 1 is divided into a lower edge U, an upper edge O, and two opposing side edges S that connect the upper edge O and the lower edge U to one another. The lower edge U of the composite pane 1 is arranged downward toward the engine of the passenger car; its upper edge O, upward toward the roof. The side edges S extend along the A-pillars in the installed state of the composite pane 1 in a motor vehicle. In the installed position, the outer pane 2 faces the external surroundings; the inner pane 6, the vehicle interior. A busbar 5 runs in each case along the upper edge O and along the lower edge U. The busbars 5 contact an electrically conductive layer 7. The electrically conductive layer 7 is a heating layer. The reflecting film 4 is inserted in the composite pane 1 such that the reflecting film 4 reflects, for example, 20% to 25% of the p-polarized light incident on the film. The functional film 4 has a peripheral edge U that is set-back in the direction of the surface center of the composite pane 1 in comparison with the peripheral edge K of the composite pane 1. The distance x between the peripheral edge U of the functional film 4 and the busbar 5 adjacent the respective edge section of the edge U, is in each case 20 mm along the entire busbar 5. The composite pane 1 has no air inclusions whatsoever, in particular, no air inclusions or defects at all can be detected in the region of the busbars 5.

FIG. 2 depicts a projection assembly for an HUD comprising the composite pane 1 of FIG. 1, with the projection assembly depicted as a cross-section along the section line AA' of the composite pane of FIG. 1. The projection assembly also comprises a projector 12 directed toward a region of the composite pane 1. In this region, usually referred to as HUD region B, images can be generated by the projector 12, which images can be perceived by a viewer 11 (vehicle driver) as virtual images on the side of the composite pane 1 facing away from him when his eyes are situated within the so-called "eyebox E". The radiation of the projector 12 is p-polarized, in particular essentially purely p-polarized. Since the projector 12 irradiates the windshield 1 at an angle of incidence of approx. 65°, which is close to Brewster's angle, the radiation of the projector is reflected only insignificantly on the external surfaces I, IV of the composite pane 1. In contrast, the reflecting film as the functional film 4 is optimized to reflect p-polarized radiation. It serves as a reflection surface for the radiation of the projector 12 for generating the HUD projection.

FIG. 3 depicts the composite pane of FIG. 1 with a detailed layer structure of the thermoplastic intermediate layer 3. The outer pane 2 and the inner pane 6 are made, for example, of soda lime glass. The outer pane 2 has an exterior-side surface I (also referred to as the outer face of the outer pane), which faces the external surroundings in the installed position, and an interior-side surface II (also referred to as the inner face of the outer pane), which faces the interior in the installed position. Likewise, the inner pane 6 has an exterior-side surface III (also referred to as the inner face of the inner pane), which faces the external surroundings in the installed position, and an interior-side surface IV (also referred to as the outer face of the inner pane), which faces the interior in the installed position. The outer pane 2 has, for example, a thickness of 2.1 mm; the inner pane 6, a thickness of 1.6 mm. The electrically conductive layer 7 in the form of a heating layer is sputtered onto the interior-side surface II of the outer pane 2. The busbars 5 make electrical contact with the electrically conductive layer 7, as a result of which the composite pane 1 can be heated by applying a voltage to the busbars 5. The first thermoplastic bonding film 3a is formed from a single ply of thermoplastic material, for example, from a PVB film with a thickness of 0.76 mm or a PVB film with acoustically damping properties with a thickness of 0.81 mm. The second thermoplastic bonding film 3b is implemented as a PVB film with a thickness of 0.38 mm. The functional film 4 is a reflecting film, which is arranged between the first thermoplastic bonding film 3a and the second thermoplastic bonding film 3b. The first thermoplastic bonding film 3a and the second thermoplastic bonding film 3b are fused to form the thermoplastic intermediate layer 3 and surround the functional film 4 encased therein. The reflecting film 4 is metal-free and suitable for reflecting at least 5%, for example, 20% to 25%, of p-polarized light incident on the film 4. The reflecting film 4 is, for example, 50 μm to 75 μm thick and is, for example, a PET-based film coated with a copolymer layer stack based on PET and PEN. The reflecting film 4 is arranged over the entire surface between the first thermoplastic intermediate layer 3 and the second thermoplastic intermediate layer 5 with the exception of a peripheral edge region R. In the region of the busbars 5, the distance between the busbar 5 and the closest section of the peripheral edge U of the functional film 4 is, in each case, 20 mm. In the remaining peripheral edge region R, no reflecting film 4 is arranged in a region with a width of 20 mm from the peripheral edge K of the composite pane 1. The composite pane 1 has an opaque masking print (not shown) that conceals the peripheral edge U and the busbars 5.

FIG. 4 depicts an embodiment of the method according to the invention at least comprising the steps:
  I Providing an inner pane 6 or an outer pane 2, with an electrically conductive layer 7 mounted on the interior-side surface II of the outer pane 2 or the exterior-side surface III of the inner pane 6,
  II Mounting at least one busbar 5 on the electrically conductive layer 7, with the at least one busbar 5 making electrically conductive contact with the electrically conductive layer 7,
  III Placing a first thermoplastic bonding film 3a on the interior-side surface II of the outer pane 2 or placing a second thermoplastic bonding film 3b on the exterior-side surface III of the inner pane 6,
  IV Placing a functional film 4, with the peripheral edge U of the functional film 4 having a distance of 5 mm to 50 mm from the nearest busbar 5,
  V Placing a second zweiten thermoplastic bonding film 3b or placing a first thermoplastic bonding film 3a,
  VI Completing the layer stack with an outer pane 2 or an inner pane 6 and laminating to form a composite pane 1.

Steps III through V can be carried out in one or more steps. The functional film 4 can be cut back before or during steps III through V.

LIST OF REFERENCE CHARACTERS 1 composite pane
2 outer pane
3 thermoplastic intermediate layer
3a first thermoplastic bonding film
3b second thermoplastic bonding film
4 functional film
5 busbar
6 inner pane
7 electrically conductive layer
10 projection assembly
11 viewer, vehicle driver
12 projector
K peripheral edge of the composite pane 1
U peripheral edge of the functional film 4
x distance between the peripheral edge U of the functional film 4 and the busbar 5
R peripheral edge region
B HUD region of the composite pane 1
E eyebox
O upper edge of the composite pane 1
U lower edge of the composite pane 1
S side edges of the composite pane 1
(I) exterior-side surface of the outer pane 2 facing away from the intermediate layer 3
(II) interior-side surface of the outer pane 2 facing the intermediate layer 3
(III) exterior-side surface of the inner pane 6 facing the intermediate layer 3
(IV) interior-side surface of the inner pane 6, facing away from the intermediate layer 3

The invention claimed is:

1. A composite pane with a functional film at least comprising a peripheral edge of the composite pane, a peripheral edge of the functional film, at least one busbar, an outer pane with an exterior-side surface and an interior-side surface, an inner pane with an exterior-side surface and an interior-side surface, and a thermoplastic intermediate layer that joins the interior-side surface of the outer pane to the exterior-side surface of the inner pane, wherein
  the functional film is encased in the thermoplastic intermediate layer,
  the peripheral edge of the functional film is set back in a direction of a surface center of the composite pane relative to the peripheral edge of the composite pane,
  the at least one busbar is arranged between the interior-side surface of the outer pane and the exterior-side surface of the inner pane and runs between the peripheral edge of the composite pane and the peripheral edge of the functional film, and
  along the at least one busbar, a distance x between the busbar and the peripheral edge of the functional film is between 5 mm and 50 mm.

2. The composite pane according to claim 1, wherein along the at least one busbar, the distance between the busbar and the peripheral edge of the functional film is 10 mm to 30 mm.

3. The composite pane according to claim 1, wherein the functional film comprises at least one carrier film based on polyethylene terephthalate (PET), polyethylene (PE), polymethyl methacrylate (PMMA), triacetyl cellulose (TAC), and/or polycarbonate and/or copolymers or mixtures thereof.

4. The composite pane according to claim 1, wherein the functional film is a reflecting film that is metal-free and is suitable for reflecting at least 5% of p-polarized light incident on the film.

5. The composite pane according to claim 4, wherein the reflecting film as a functional film is between 20 μm and 120 μm thick.

6. The composite pane according to claim 4, wherein the reflecting film as a functional film is a polyethylene terephthalate (PET) based film that is coated with a copolymer layer stack based on PET and/or polyethylene naphthalate (PEN).

7. The composite pane according to claim 1, wherein the at least one busbar is mounted on and electrically contacts an electrically conductive layer.

8. The composite pane according to claim 7, wherein the electrically conductive layer is mounted flat on the interior-side surface of the outer pane or the exterior-side surface of the inner pane.

9. The composite pane according to claim 1, wherein the thermoplastic intermediate layer comprises at least one first thermoplastic bonding film and a second thermoplastic bonding film, between which the functional film is inserted.

10. The composite pane according to claim 9, wherein the first thermoplastic bonding film has a thickness of 200 μm to 1000 μm and the second thermoplastic bonding film is between 10 μm and 120 μm thick.

11. The composite pane according to claim 1, wherein the first thermoplastic bonding film is a film with acoustically damping properties, an infrared-radiation-absorbing intermediate layer, a colored intermediate layer, or a combination of these.

12. A method for producing a composite pane according to claim 1, the method comprising:
  a) providing the inner pane or the outer pane,
  b) applying the at least one busbar,
  c) placing the thermoplastic intermediate layer with functional film thereon to form a layer stack, and
  d) laminating the layer stack with the outer pane or the inner pane to form a composite pane, wherein, before or during step c), the functional film is cut back, and after being cut back, the peripheral edge of the functional film has a distance of 5 mm to 50 mm from the busbar.

13. The method according to claim 12, wherein before or during step a), an electrically conductive layer is applied to the interior-side surface of the outer pane or the exterior-side surface of the inner pane and the at least one busbar is electrically conductively applied to the electrically conductive layer.

14. The method according to claim 12, wherein during or after step b) and before step d), a deaeration structure is embossed into the at least one busbar.

15. A method comprising providing a composite pane according to claim 1 in a motor vehicle.

16. The composite pane according to claim 2, wherein along the at least one busbar, the distance between the busbar and the peripheral edge of the functional film is 15 mm to 25 mm.

17. The composite pane according to claim 3, wherein the carrier film is based on polyethylene terephthalate (PET).

18. The composite pane according to claim 4, wherein the functional film is a reflecting film that is metal-free and is suitable for reflecting between 15% to 30% of p-polarized light incident on the film.

19. The composite pane according to claim 5, wherein the reflecting film as a functional film is between 30 μm and 90 μm thick.

20. The composite pane according to claim 10, wherein the first thermoplastic bonding film has a thickness of 300 μm to 850 μm and the second thermoplastic bonding film is between 15 μm and 90 μm thick.

\* \* \* \* \*